United States Patent [19]

Jutte et al.

[11] 4,214,045
[45] Jul. 22, 1980

[54] CONTAINER FOR A MAINTENANCE-FREE BATTERY

[75] Inventors: Gottfried W. Jutte, Indianapolis; John V. McHugh, Greenfield, both of Ind.

[73] Assignee: The Richardson Company, Des Plaines, Ill.

[21] Appl. No.: 935,250

[22] Filed: Aug. 21, 1978

[51] Int. Cl.² .............................................. H01M 2/12
[52] U.S. Cl. ..................................... 429/87; 429/175; 429/176
[58] Field of Search ....................... 429/87, 89, 86, 88, 429/82, 175, 176

[56] References Cited

U.S. PATENT DOCUMENTS

| 3,669,755 | 6/1972 | Hughes, Jr. | 429/87 |
| 4,098,963 | 7/1978 | Moras | 429/89 X |

*Primary Examiner*—Charles F. Lefevour
*Attorney, Agent, or Firm*—Lockwood, Dewey, Alex & Cummings

[57] ABSTRACT

A container for a maintenance-free lead-acid storage battery includes a multi-compartment base wherein individual cells of the battery are contained. An overlying cover in vapor-sealed engagement with the base includes a plurality of integrally-molded filler wells which extend from a recess in the top surface of the cover into respective cell compartments of the battery. A one-piece molded vent cover seated within the recess includes a plurality of vent plug portions which extend through the filler wells into respective ones of the cell compartments. An annular flange associated with each filler well coacts with ribs on the vent plug portions to lock the vent cover in place. Escaping battery gas is conveyed from each of the cell compartments by axially-extending recesses on the vent plug portions, which form passageways from each cell compartment, and by ribs on the underside of the vent cover which space the vent cover from the battery cover to provide an additional passageway extending to the escape gas gap through a peripheral gap formed between the vent cover and the side walls of the recess.

24 Claims, 9 Drawing Figures

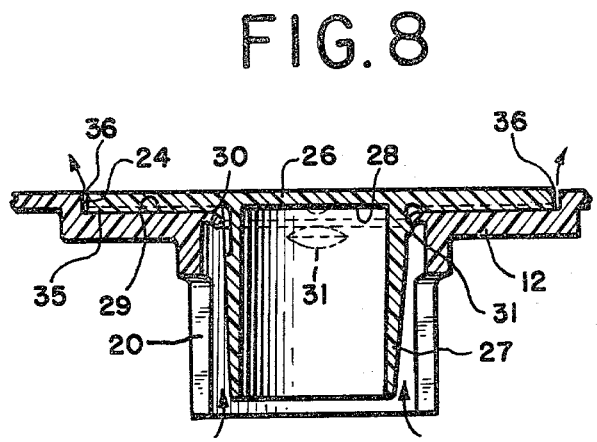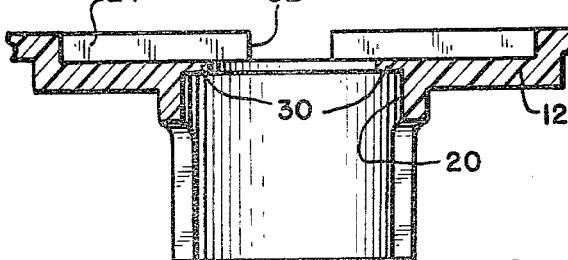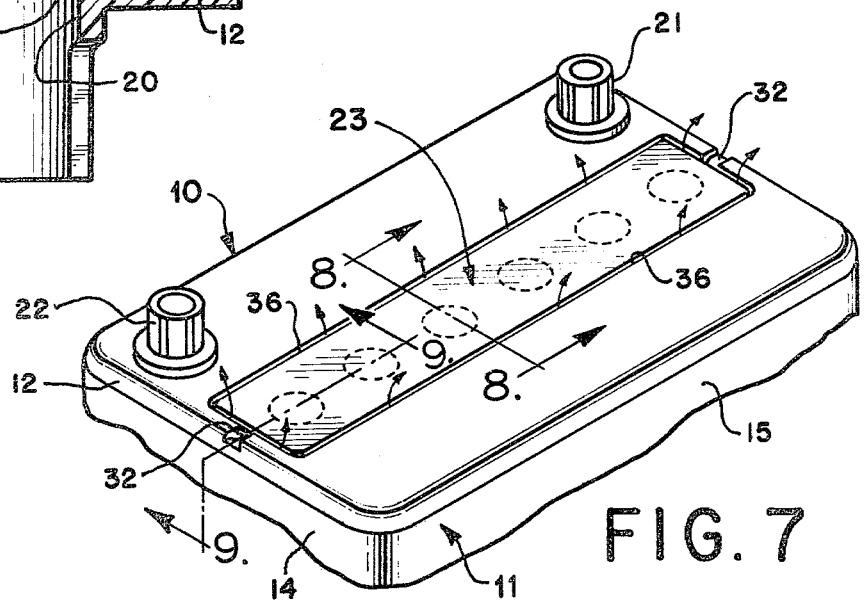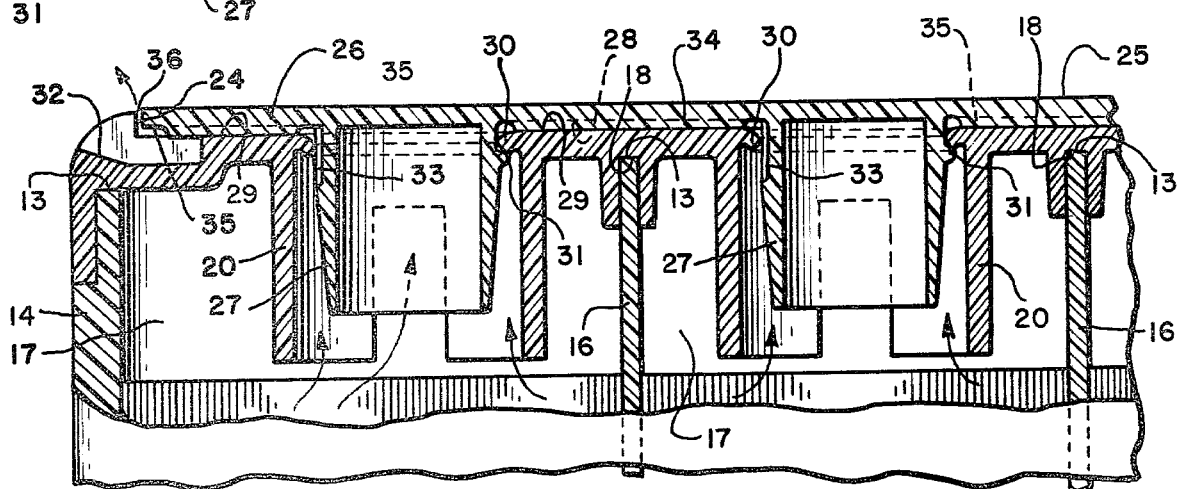

CONTAINER FOR A MAINTENANCE-FREE BATTERY

BACKGROUND OF THE INVENTION

This invention is directed generally to containers for electrical batteries, and more particularly to a container for maintenance-free batteries which is less costly to manufacture and which provides improved dispersion of escaping battery gas.

Electrical storage batteries of the lead-acid type typically comprise a plurality of individual cell compartments each having a filler well through which electrolyte is replenished and through which hydrogen and oxygen gases generated within the cell compartment during operation of the battery are egressed. Vented caps installed over the filler wells prevent the electrolyte from spilling or splashing out while allowing the gases developed within the battery to be vented.

In recent years there has been a trend, particularly in automotive applications, toward the use of lead-acid batteries which require, once in service, no maintenance throughout their expected life. Basically, such "maintenance-free" batteries utilize an internal construction which makes it unnecessary to inspect and replenish electrolyte levels over the expected life of the battery. As a result, removable vent caps are not required and it is possible to achieve a substantially flat and seamless battery container providing improved appearance and installation convenience.

Unfortunately, prior art containers for maintenance-free batteries have been undesirably expensive to produce primarily as a result of utilizing cover constructions which required an unnecessarily large number of components and which were unnecessarily difficult to assemble. One example of such prior art constructions is shown in U.S. Pat. No. 3,802,597, wherein separate vent plugs are provided for each battery cell and an overlying cover strip is utilized to maintain the vent plugs in position.

Accordingly, it is a general object of the present invention to provide a new and improved container for a maintenance free battery.

It is another object of the present invention to provide a container for a maintenance-free battery which is simpler in construction, more economical to manufacture, and which provides improved dispersion of gases egressing from the battery.

It is another object of the present invention to provide a cover for a maintenance-free battery container which utilizes only two integrally-molded snap-lock components.

SUMMARY OF THE INVENTION

The invention is directed to a multi-compartment container for a maintenance-free battery. The container includes a base and a cover adapted for vapor-sealed engagement with the base. A plurality of filler wells extend from a recess on the top surface of the cover through the cover to respective ones of the battery cell compartments. The filler wells are closed by a one-piece vent cover which is seated within the recess and includes a plurality of vent plug portions projecting through respective filler wells into respective cell compartments of the battery. The vent cover is dimensioned to provide a peripheral gas escape gap between the sidewalls of the recess and the cover strip, and includes a bottom surface opposing the underlying surface of the recess. Rib portions are provided on at least one of the opposing surfaces to space the vent cover from the battery cover to form a distribution passageway to the gas escape gap for battery gas egressing through the filler wells.

The invention is further directed to a cover as described above for use in conjunction with a battery container base having side and end walls, and a plurality of interior divider walls, wherein the bottom surface is adapted for vapor-sealed engagement with the container walls to restrict gas flow from the cell compartments of the battery to the manifold.

The invention is further directed to a method of forming a battery container as described above, wherein upon assembly the vent cover is automatically locked in place within the cover recess without the need for additional bonding or sealing operations.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in conjunction with the accompanying drawings, in the several Figures of which like reference numerals identify like elements, and in which:

FIG. 4 is an enlarged cross-sectional view of the vent cover taken along line 4—4 of FIG. 3.

FIG. 5 is an enlarged cross-sectional view of one filler well portion of the battery container cover taken along line 5—5 of FIG. 1.

FIG. 6 is a bottom end view of one vent plug portion of the vent cover taken along line 6—6 of FIG. 4.

FIG. 7 is a perspective view of the battery container cover with vent cover installed showing the flow of battery gases therefrom.

FIG. 8 is an enlarged cross-sectional view of the battery container cover with vent cover installed along line 8—8 of FIG. 7.

FIG. 9 is an enlarged cross-sectional view of the battery container cover with vent cover installed taken along 9—9 of FIG. 7.

DESCRIPTION OF THE PREFERRED EMBODIMENT

Figure 1:
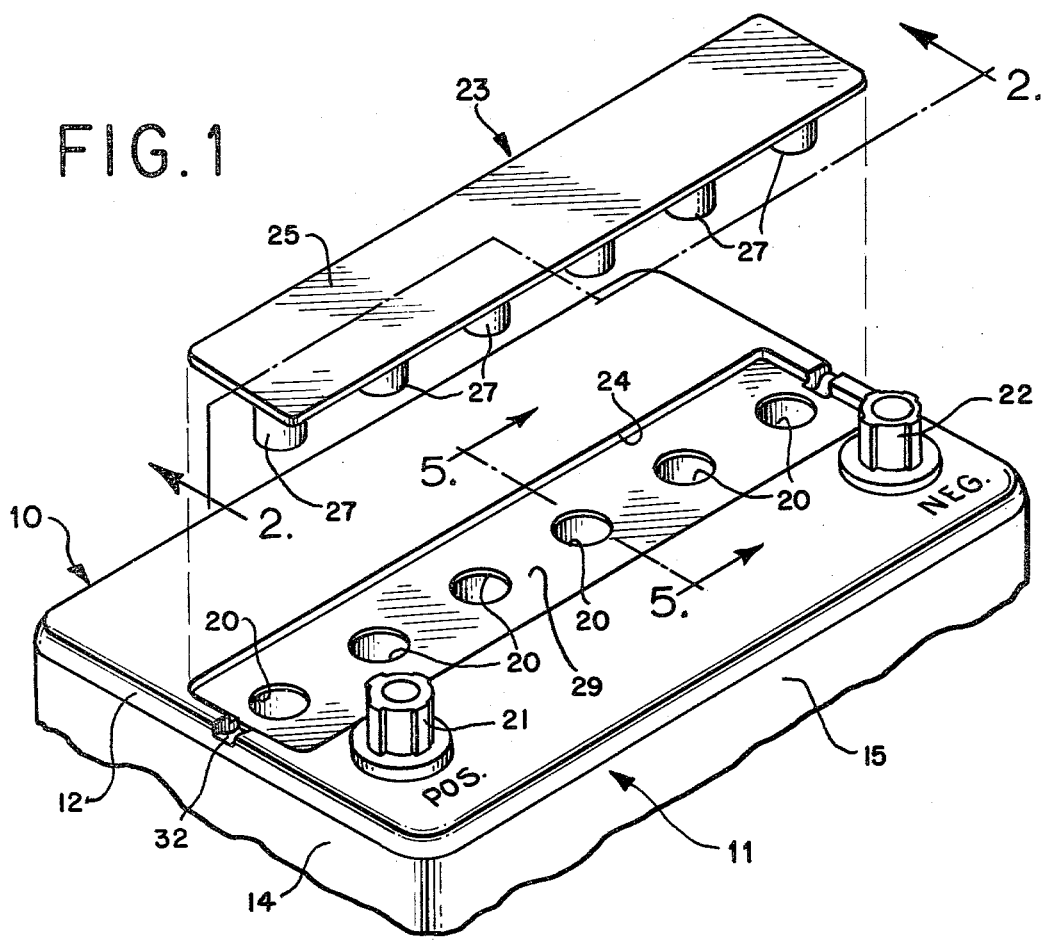
FIG. 1 is an exploded perspective view of the battery cover of the invention with the vent cover thereof removed for access to the cell compartments of the battery.

Referring to the Figures, and particularly to FIGS. 1 and 9, a cover 10 for use with a container base 11 for a multi-cell lead-acid battery is seen to include a generally rectangular cover body portion 12 dimensioned to receive in vapor-sealed bonded engagement the edges 13 of the end walls 14, sidewalls 15, and interior divider walls 16 of the battery container base. In accordance with conventional practice, the interior walls 16 (FIG. 9) divide the battery container into individual compartments 17, within which individual cells of the battery are contained. In the illustrated embodiment, which is intended to develop approximately 12VDC, five such divider walls are provided to form six cell compartments within the container.

With the exception of the container as described herein, the battery may be entirely conventional in design and construction, utilizing known electrode materials and electrolyte solution in each cell compartment with known interconnection techniques to develop the desired output voltage. For improved mechanical strength, appropriately dimensioned slots or recesses 18 may be molded into the underside of the cover of the battery container to receive the edges of walls 14, 15, 16 in either heat-sealed or epoxy-bonded engagement.

Access to the individual cell compartments 17 of the battery is provided by means of six cylindrical filler wells 20 which are integrally molded into the cover body. These filler wells each include a central bore which extends through the cover body into communication with respective ones of the cell compartments, and a sleeve-shaped body portion which projects downwardly from the bottom surface of the cover body. It is through these filler wells that testing and replenishment of the liquid electrolyte in each cell compartment is accomplished.

Electrical power is supplied to and withdrawn from the battery by conventional means in the form of positive and negative polarity battery terminals 21 and 22. These terminals, which may be conventional in design and construction, are connected to electrodes in the individual cell compartments of the battery in a manner well known to the art. Although the terminals are shown on the top surface of the battery container cover, it will be appreciated that other locations are possible in practicing the invention, including locations on a side wall of the battery container.

Figure 2:
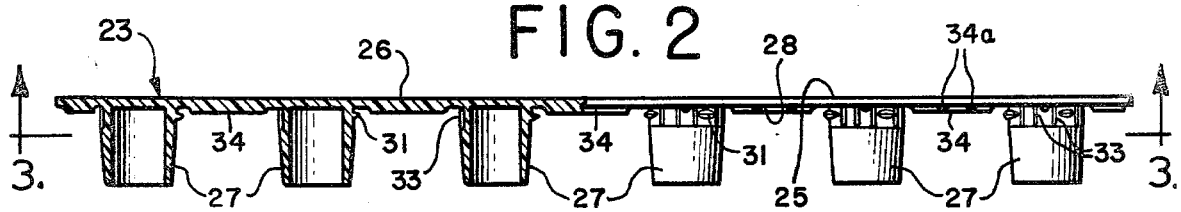
FIG. 2 is a cross-sectional view of the vent cover taken along line 2—2 of FIG. 1.
Figure 3:
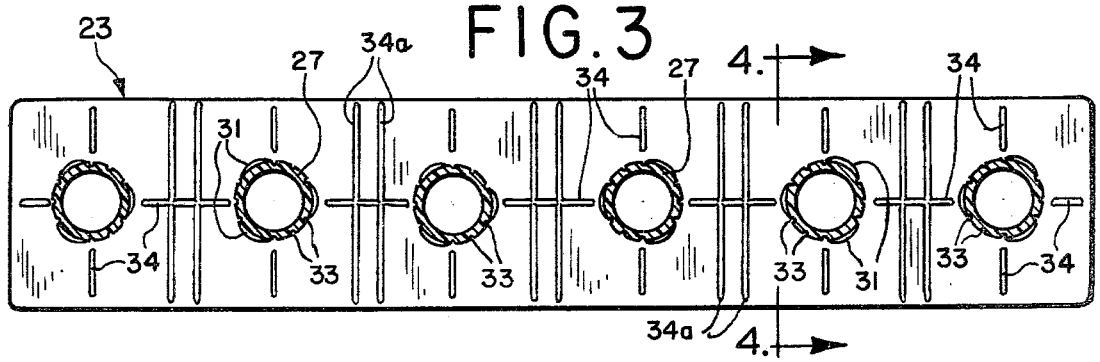
FIG. 3 is a cross-sectional view of the vent cover taken along line 3—3 of FIG. 2.

In accordance with the invention, filler wells 20 are sealed against leakage of electrolyte from the battery cell compartments by means of a single-piece vent cover 23 positioned within a complimentarily dimensioned recess 24 on the top surface 25 of the cover body. Referring to FIGS. 2-4, vent cover 23 is seen to comprise a generally flat body portion 26 which fits within recess 24, and a plurality of vent plug portions 27 which project downwardly from the bottom surface of the body portion. The top surface 25 of the vent cover may be generally smooth, as shown, or may be embossed with a logo or other descriptive material. In the illustrated embodiment the overall thickness of the body portion is such that when the vent cover is seated against the bottom surface 29 of the recess, a substantially smooth and contiguous surface is formed in conjunction with the adjoining top surface of cover body 12.

To provide for closing of the six filler wells 20, vent plug portions 27 are dimensioned and positioned center-to-center so as to extend through filler wells 20 with a vapor-tight seal. Further to this end, each filler well is provided with a deformable annular flange portion 30 (FIG. 5) adjacent surface 29. When vent plug portions 27 are inserted through filler wells 20, as shown in FIG. 8, these flange portions are deformed inwardly of the battery container, thereby improving the vapor seal between the outer surface of the vent plug portion and the battery cover body.

To provide a means for positively locking the vent cover in position, the outer surface of each vent plug portion 27 is provided with a rib or lug portion 31 against which the edge of the flange portion of the associated filler well 20 can engage when vent cover 23 is seated in recess 24 and the vent plugs 27 are fully extended through the filler wells. The effect of this is to lock each of the vent plug portions 27 in position, thus locking the entire vent cover 23 within recess 24 without the necessity of providing additional latching components or latching structure on the battery cover. For servicing purposes, it is contemplated that slots 32 may be provided at opposite ends of recess 24 to enable a screwdriver or other tool to be used to pry up the vent cover.

To provide a flow path for battery gas egressing from the individual cell compartments 17 of the battery the outer surfaces of vent plug portions 27 are provided with a plurality of axially-extending slot-like depressions 33. When the vent plug portions 27 are seated within filler wells 20, as shown in FIG. 8, these slot-like recesses 33 each establish a flow path under the associated annular flange 30 from the associated battery well compartment. To establish a flow path for the gases escaping through recesses 33 to the exterior of the battery, the bottom surface 28 of body portion 26 includes a plurality of raised rib portions 34 which establish a spacing between the bottom surface 28 of the vent cover member and the bottom surface 29 of recess 24. This spacing in effect forms a passageway or distribution chamber 35 (FIGS. 8 and 9) between the cover housing and vent cover which serves to convey the egressing gas substantially omnidirectionally from each filler well aperture to a gas escape gap 36 (FIGS. 7-9) formed between the sidewalls of body portion 25 and the sidewalls of recess 24. A plurality of transverse rib portions 34A reduce the possibility of electrical conduction being established between adjacent cells by Electrolyte in chamber 35.

Thus, gas generated within one of the battery cell compartments 17 is conveyed through the filler well 20 associated with that cell by way of the apertures 33 contained within the outer surface of the associated vent plug portions 27. From there, the egressing gas is caused to disperse within the passageway 35 formed between the bottom surface 28 of vent cover 23 and the bottom surface 29 of aperture 24 until reaching gap 36, through which the gas is dispersed into the atmosphere surrounding the battery.

To provide the widest possible dispersion for the escaping battery gas and to preclude the possibility of inward flame propagation should the gas ignite, it is desirable that battery vent cover 23 and recess 24 be dimensioned to provide a substantially continuous gap 36 having a width smaller than the flame quenching distance of the gas. In one successful embodiment of the invention, the sidewalls of the recess and the vent cover were spaced 0.004 inches and the body portion of vent cover 23 was formed with a thickness of 0.060 inches to form a gap about the circumference of the vent cover having a width of 0.004 inches and length of 0.060 inches. The rib portions 34 were formed with a height of approximately 0.004 inches to provide a like height for passageway 36, and the depressions 33 on vent plugs 27 were formed to a depth of approximately 0.004 inches to provide passageways from each cell compartment of like width. As a result of the wide dispersion of the egressing battery gas provided by this construction, the concentration of gas at any one point outside of the battery is below that required to sustain combusion.

Although the vent plug portions 27 are shown to be hollow and generally tubular in form, it will be appreciated that these components can also be constructed as solid dowel-shaped members, or in other shapes and sizes. Furthermore, insertion of vent plugs portion 27 into apertures 20 may be facilitated by progressively tapering the projecting ends thereof inwardly so as to more readily pass through the apertures prior to deflection of the associated flange portions of the cover.

The battery cover construction of the present invention provides a closure for all six cells of the battery utilizing only two integrally-molded components. The resulting structure provides wide dispersion of the egressing battery gas, and an exterior having a smooth substantially contiguous tamper-resistant surface.

In assembling the battery container, the container base, the base cover, and the vent cover are first formed by conventional molding techniques. Then, after the electrodes and related structures of the battery have been assembled, the base cover and base are joined by conventional sealing or bonding techniques. Finally, the cell compartments are filled with electrolyte and the vent cover is snapped into place. The battery cover and vent cover may be molded of a high impact electrically-insulating acid-resistant material such as polypropylene. Although shown in conjunction with a six cell battery, it will be appreciated that the battery cover construction can be utilized with batteries having a lesser or greater number of cells.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A battery container for a battery comprising, in combination:
    a container base including side walls forming a compartment for the battery;
    means for enclosing said container base including a cover member having a top surface, a bottom surface adapted for engaging the side walls of said container base, a recess on said top surface defining a first opposing surface, and at least one filler well portion extending from said recess to the interior of the battery container, and a flange portion generally surrounding said filler well portion;
    a vent cover including a generally flat body portion seated within said recess and dimensioned to provide a gas escape gap between the side walls of said recess and the side walls of said vent cover, and a bottom surface defining a second opposing surface;
    venting means including at least one vent plug portion projecting from said bottom surface of said vent cover body portion, said one vent plug portion having a sidewall extending through said filler well into the interior of the battery container, and an axially directed recess between said vent plug sidewall and filler well for establishing a first passageway for conveying gases egressing from said battery container, said vent plug portion including a lug portion which cooperates with said flange portion to secure said vent cover to said means for enclosing said container base; and
    means including at least one rib portion on at least one of said opposing surfaces for spacing said bottom surface of said vent cover from said first opposing surface of said recess to form a second passageway, said second passageway providing gas passing communication between said first passageway and said gas escape gap.

2. A battery container as defined in claim 1 wherein said vent plug portion is integrally formed with said body portion of said vent cover.

3. A battery container as defined in claim 1 wherein the projecting end of vent plug portion is progressively inwardly tapered.

4. A battery container as defined in claim 1 wherein said vent plug portion is dimensioned for vapor-sealing engagement with the periphery of said filler well.

5. A battery container as defined in claim 1 wherein said flange portion is adapted for deflection inwardly of said battery container upon insertion of said vent plug portion through said filler well.

6. A battery container for a multiple cell battery comprising, in combination:
    a container base including side walls and a plurality of interior divider walls forming individual battery cell compartments;
    means for enclosing said container base including a cover member having a top surface, a bottom surface adapted for engaging said walls of said container base, a recess on said top surface defining a first opposing surface, and a plurality of filler well portions extending from said recess to respective cell compartments of the battery container, and a flange portion generally surrounding said filler well portion;
    a vent cover including a generally flat body portion seated within said recess and dimensioned to provide a peripheral gas escape gap between the side walls of said recess and the side walls of said vent cover, and a bottom surface defining a second opposing surface;
    venting means including a plurality of vent plug portions projecting from said bottom surface of said vent cover body portion, each said vent plug portion having a sidewall extending through the filler well associated therewith, and an axially directed recess between each said vent plug sidewall and the filler well associated therewith for establishing respective first passageways for conveying gases egressing from said compartments, at least one of said vent plug portions having a lug portion which cooperates with the flange portion of the filler well associated therewith to secure said vent cover means to said means for enclosing said container base; and
    means including a plurality of rib portions disposed on at least one of said opposing surfaces for spacing said bottom surface of said vent cover from said first opposing surface of said recess to form a second passageway, said second passageway providing gas passing communication between said first passageway and said peripheral gas escape gap.

7. A battery container as defined in claim 6 wherein said vent plug portions are integrally formed with said body portion of said vent cover.

8. A battery container as defined in claim 6 wherein the projecting ends of said vent plug portions are progressively inwardly tapered.

9. A battery container as defined in claim 6 wherein said vent plug portions are dimensioned for vapor-sealing engagement with a peripheral portion of said filler wells.

10. A battery container as defined in claim 6 wherein said flange portions are each adapted for deflection inwardly of said battery container upon insertion of said vent plug portions through said filler wells.

11. A battery container for a multiple cell battery comprising, in combination:
a container base including said wells and a plurality of interior divider walls forming individual battery cell compartments;
means for enclosing said container base including a cover member having a top surface, a bottom surface adapted for engaging said walls of said container base, a recess on said top surface defining a first opposing surface, and a plurality of filler well portions extending from said recess to respective cell compartments of the battery container, each of said filler well portions including an inwardly-deformable annular flange portion about the inside periphery thereof, and a flange portion generally surrounding said filler well;
a vent cover including a generally flat body portion seated within said recess and dimensioned to provide a generally continuous gas escape gap between the sidewalls of said recess and the sidewalls of said vent cover, a top surface substantially contiguous with the top surface of said cover, and a bottom surface defining a second opposing surface;
venting means including a plurality of integrally formed plug portions projecting from said bottom surface of said vent cover body portion, each of said plug portions having a sidewall dimensioned for vapor-sealed engagement with the flange portion of the filler well associated therewith, each of said plug portions also including an axially directed recess for establishing a first passageway for conveying gases egressing from said compartments, at least one of said vent plug portions having a plug portion which cooperates with the flange portion of the filler well associated therewith to secure said vent cover means to said means for enclosing said container base; and
a plurality of rib portions on at least one of said opposing surfaces for spacing said bottom surface of said vent cover from the first opposing surface of said recess to form a passageway for providing gas passing communication between said first passageways and said peripheral gas escape gap.

12. A battery container as defined in claim 11 wherein the projecting ends of vent plug portions are progressively inwardly tapered.

13. A battery container for a multiple cell battery comprising, in combination:
a container base including side walls and a plurality of interior divider walls froming individual battery cell compartments;
means for enclosing said container base including a cover member having a generally planar top surface, a bottom surface adapted for engaging said walls of said base, a recess on said top surface defining a first opposing surface, and a plurality of filler well portions extending from said recess to respective cell compartments of said battery container, each of said filler well portions including an inwardly-deformable annular flange portion about the inside periphery thereof;
a vent cover including a generally flat body portion seated within said recess and dimensioned to provide in conjunction with said top surface of said cover member a substantially contiguous planar surface including a peripheral gas escape gap between the sidewalls of said recess and said vent cover, and a bottom surface defining a second opposing surface;
venting means including a plurality of integrally-formed vent plug portions projecting from said bottom surface of said vent cover body portion, each of said vent plug portions having a generally cylindrical sidewall extending through the filler well associated therewith, each said cylindrical sidewall including an axially directed recess for establishing a plurality of first passageways for conveying gases egressing from said compartments;
means including a plurality of rib portions on at least one of said opposing surfaces for spacing said bottom surface of said vent member from said first opposing surface of said recess to form a second passageway, said second passageway providing gas passing communication between said first passageways and said peripheral gas escape gap, and
means including at least one lug portion on the outer surface of the cylindrical sidewall of each of said vent plug portions for coacting with the associated one of said flange portions for retaining said vent cover seated within said recess.

14. A cover for a battery container of the type having a container base including side walls forming a compartment for the battery, comprising, in combination:
means for enclosing said container base including a cover member having a top surface, a bottom surface adapted for engaging the side walls of said container base, a recess on said top surface defining a first opposing surface, and at least one filler well portion extending from said recess to the interior of the battery container, and a flange portion generally surrounding said filler well portion;
a vent cover including a generally flat body portion seated within said recess and dimensioned to provide a gas escape gap between the side walls of said recess and the sidewalls of said vent cover, and a bottom surface defining a second opposing surface;
venting means including at least one vent plug portion projecting from said bottom surface of said body portion, said one vent plug portion having a sidewall extending through said filler well into the interior of the battery compartment, an axially directed recess between said vent plug sidewall and filler well for establishing a first passageway for conveying gases egressing from said battery container, said vent plug including a lug portion which cooperates with said flange portion to secure said vent cover to said means for enclosing said container base; and
means for including at least one rib portion on at least one of said opposing surfaces for spacing said bottom surface of said vent cover from said first opposing surface of said recess to form a second passageway, said second passageway providing gas passing communication between said first passageway and said peripheral gas escape gap.

15. A cover for a battery container as defined in claim 14 wherein said vent plug portion is integrally formed with said body portion of said vent cover.

16. A cover for a battery container as defined in claim 14 wherein the projecting end of vent plug portion is progressively inwardly tapered.

17. A cover for a battery container as defined in claim 4 wherein said vent plug portion is dimensioned for vapor-sealing engagement with the periphery of said filler well.

18. A cover for a battery container as defined in claim 14 wherein said flange portion is adapted for deflection inwardly of said battery container upon insertion of said vent plug portion through said filler well.

19. A cover for a battery container of the type having a container base including side walls and a plurality of interior divider walls forming individual battery cell compartments, comprising, in combination:
    means for enclosing said container base including a cover member having a top surface, a bottom surface adapted for engaging said walls of said container base, a recess on said top surface defining a first opposing surface, and a plurality of filler well portions extending from said recess to respective cell compartments of the battery container, and a flange portion surrounding each of said filler well portions;
    a vent cover including a generally flat body portion seated within said recess and dimensioned to provide a peripheral gas escape gap between the side walls of said recess and the side walls of said vent cover, and a bottom surface defining a second opposing surface;
    venting means including a plurality of vent plug portions projecting from said bottom surface of said body portion, said vent plug portions each having a sidewall extending through said filler wells into said cell compartments, said venting means also including an axially directed recess between each said vent plug sidewalls and the filler well associated therewith for establishing respective first passageways for conveying gases egressing from said compartments, each said vent plug portion also including a lug portion which cooperates with the flange portion of the filler well through which said vent plug portion extends to secure said vent cover to said means for enclosing said container base; and
    means including a plurality of rib portions disposed on at least one of said opposing surfaces for spacing said bottom surface of said vent cover from said first opposing surface of said recess to form a second passageway, said second passageway providing gas passing communication between said first passageways and said peripheral gas escape gap.

20. A cover for a battery container as defined in claim 19 wherein said vent plug portions are integrally formed with said body portion of said vent cover.

21. A cover for a battery container as defined in claim 19 wherein said vent plug portions are dimensioned for vapor-sealing engagement with a peripheral portion of said filler wells.

22. A cover for a battery container as defined in claim 19 wherein said flange portion is adapted for deflection inwardly of said battery container upon insertion of said vent plug portions through said filler wells.

23. A cover for a battery container of the type having a container base including side walls and a plurality of interior divider walls forming individual battery cell compartments, comprising, in combination:
    means for enclosing said container base including a cover member having a top surface, a bottom surface adapted for engaging said walls of said container base, a recess on said top surface defining a first opposing surface, and a plurality of filler well portions extending from said recess to respective cell compartments of the battery container, each of said filler well portions including an inwardly-deformable annular flange portion about the inside periphery thereof;
    a vent cover including a generally flat body portion seated within said recess and dimensioned to provide a generally continuous gas escape gap between the sidewalls of said recess and the sidewalls of said vent cover, and a bottom surface defining a second opposing surface;
    venting means including a plurality of integrally formed plug portions projecting from said bottom surface of said vent cover into said battery cell compartments, each of said plug portions having a generally cylindrical sidewall dimensioned for vapor-sealed engagement with said flange portions and including at least one axially-extending recess on the surface thereof for establishing first passageways for conveying gases egressing from said compartments;
    means including at least one lug portion on the outer surface of the cylindrical sidewall of each said vent plug portions for coacting with the flange portion of the filler well associated therewith to retain said vent cover within said recess; and
    a plurality of rib portions on at least one of said opposing surfaces for spacing said bottom surface of said vent cover from the first opposing surface of said recess to form a passageway for providing gas passing communication between said first passageways and said peripheral gas escape gap.

24. A cover for a battery container of the type having a container base including side walls and a plurality of interior divider walls forming individual battery cell compartments, comprising, in combination:
    means including a cover member having a generally planar top surface, a bottom surface adapted for engaging said walls of said base, a recess on said top surface defining a first opposing surface, and a plurality of filler well portions extending from said recess to respective cell compartments of said battery container, each of said filler well portions including an inwardly-deformable annular flange portion about the inside periphery thereof, for forming when installed on said base an enclosure for the battery;
    venting means including a plurality of integrally-formed vent plug portions projecting from said bottom surface of said body portion through said filler wells into said battery cell compartments, each said vent plug portion including an axially directed recess for establishing a plurality of first passageways for conveying gases egressing from said compartments;
    a vent cover including a generally flat body portion seated within said recess and dimensioned to provide in conjunction with said top surface of said cover member a substantially contiguous planar surface including a peripheral gas escape gap between the sidewalls of said recess and said vent cover and a bottom surface defining a second opposing surface;
    at least one lug portion on the outer surface of each of said vent plug portions for coacting with the associated one of said flange portions for retaining said vent cover seated within said recess; and
    means including a plurality of rib portions on at least one of said opposing surfaces for spacing said bottom surface of said vent member from said first opposing surface of said recess to form a second passageway for providing gas passing communication between said first passageways and said peripheral gas escape gap.

* * * * *